XR 2,678,998
SS REFERENCE SEARCH ROOM

INVENTOR
W. R. YOUNG Jr.
BY N. S. Ewing
ATTORNEY

May 18, 1954 W. R. YOUNG, JR 2,678,998

AUTOMATIC REGULATION OF VEHICLE-RADIATED POWER IN MOBILE RADIO SYSTEM

Filed Jan. 13, 1950 3 Sheets-Sheet 2

INVENTOR
W. R. YOUNG Jr.
BY N. S. Ewing
ATTORNEY

May 18, 1954 W. R. YOUNG, JR 2,678,998

AUTOMATIC REGULATION OF VEHICLE-RADIATED POWER IN MOBILE RADIO SYSTEM

Filed Jan. 13, 1950 3 Sheets-Sheet 3

INVENTOR
W. R. YOUNG Jr.
BY
N. S. Ewing
ATTORNEY

Patented May 18, 1954 2,678,998

UNITED STATES PATENT OFFICE 2,678,998

AUTOMATIC REGULATION OF VEHICLE-RADIATED POWER IN MOBILE RADIO SYSTEM

William R. Young, Jr., Summit, N. J., assignor to Bell Telephone Laboratories, Incorporated, New York, N. Y., a corporation of New York Application January 13, 1950, Serial No. 138,291

7 Claims. (Cl. 250—6)

This invention relates in general to electrical transmission systems; and more particularly to mobile radio systems having a fixed central station and one or more vehicle-borne subscriber stations.

In a mobile radio system of the aforesaid type which includes a large number of central and subscriber stations utilizing many channel frequencies within a given area, it is necessary to impose rigorous requirements upon the central-station receivers as to selectivity, spurious response, and cross modulation because of the wide variation that occurs in the level of signals received from the mobile transmitters as the latter move forward and away from the respective central stations.

It is the principal object of this invention to provide for the automatic regulation of vehicle-radiated power in a mobile radio system.

A more specific object of the invention is to provide for the operation of mobile transmitters at different levels of power within specified ranges of a central-station transmitter, without necessitating excessive switching at the central station.

The present invention contemplates regulating the input power to the central-station receiver so as to obtain a prescribed range of received powers by providing a device which responds when the incoming signal exceeds a certain threshold, and which automatically transmits this information by way of the central-station transmitter to the vehicle with which it is communicating. The vehicular equipment is then arranged to reduce the radiated power appropriately. Translating this into physical terms, the area surrounding the central station falls into two or more operational zones; and as the vehicle-borne subscriber station approaches the central station, the level of its transmitted carrier power is reduced as it passes from one zone to the next.

In accordance with a further feature of the invention, excessive switching of the mobile-transmitter power, such as might occur when the mobile station is carried along a road winding in and out of the low-level zone, is prevented by providing a different threshold for reducing the mobile-transmitter power from a higher to a lower level as a vehicle approaches the central station, than for restoring it to the higher level as a vehicle recedes from the central station. This is carried out in one embodiment by transmitting a pilot signal from the mobile station simultaneously with the reduction of power, in response to which the attenuation of signals received by the central-station receiver is increased by an amount which slightly exceeds the amount by which the mobile power has been reduced. In accordance with another embodiment, a similar feature is provided by a relay system that operates whenever the signal power received from the mobile station exceeds one or another different "threshold" values causing one or another of correspondingly different pilot tones to be transmitted which in turn cause the mobile transmitter to operate at respectively different levels of carrier energy. The difference between operational thresholds for different tones at the central station slightly exceeds the difference between successive levels of mobile-transmitted power.

In the simplest form in which application of the invention is contemplated, provision is made for switching between two levels of mobile-transmitted power. A more complex form of the invention provides for intermediate levels of mobile-transmitted power also.

As used in the specification and claims herein, the phrase "level of mobile-transmitted power" refers to the amount of unmodulated carrier wave power radiated from a mobile unit, which is measured in decibels above or below selected reference power.

The principle of the present invention is applicable to both full duplex systems, and in half duplex systems which include push-to-talk circuits at the mobile stations. In the former case, special signals relative to the power received at the central station from the mobile transmitter may be transmitted back to the vehicle as required without reference to direction of voice if they are subaudible or superaudible and not otherwise unobjectionable. In the half duplex case such special signals are transmitted from the central station by delayed acting means after the close of the period of voice transmission by the mobile station, and stored in the mobile receiver for use during the next period of voice transmission.

The present invention in its various ramifications will be better understood from a study of the detailed description hereinafter with reference to the attached drawings, in which.

Figure 1:
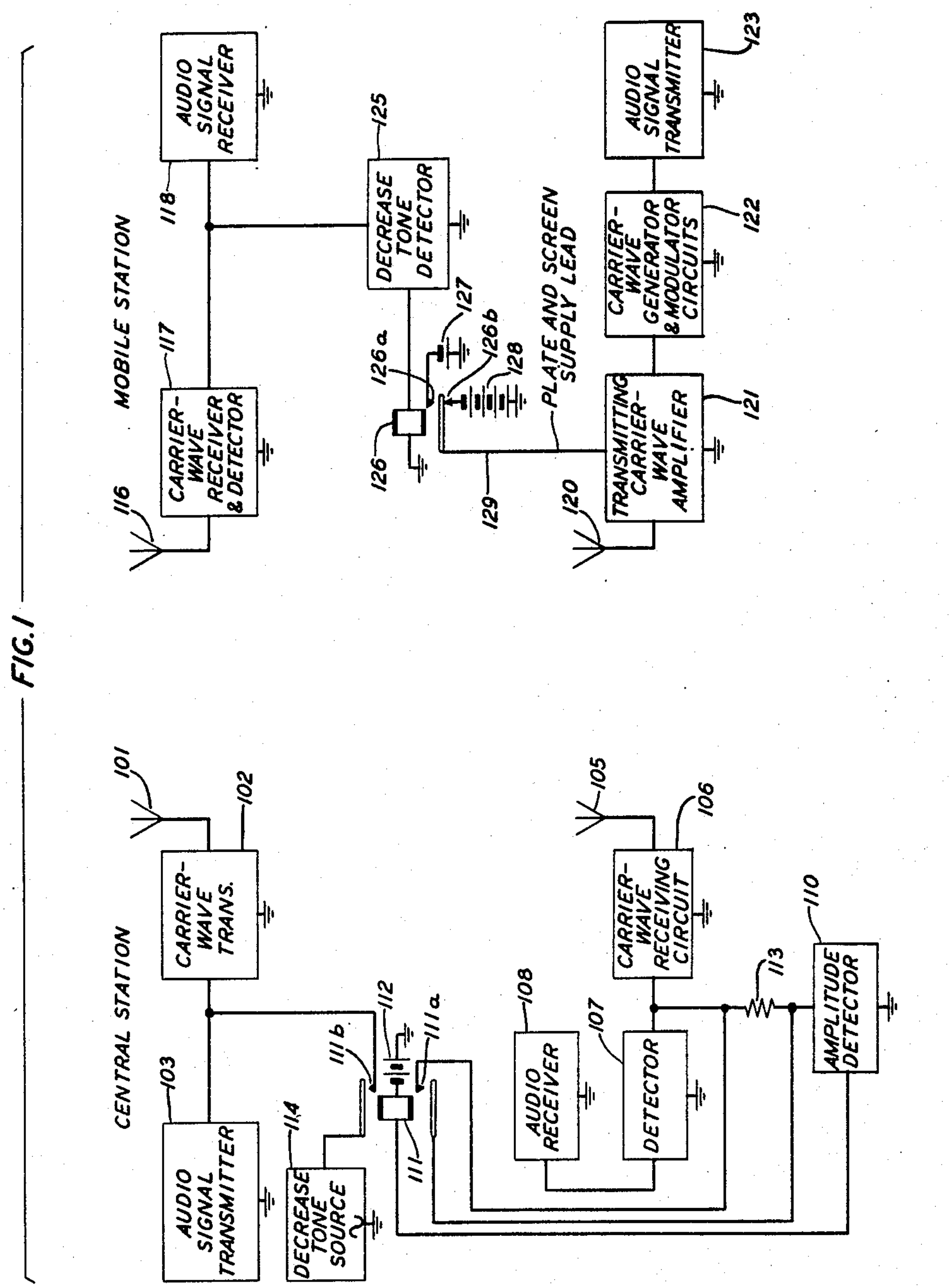
Fig. 1 shows a full duplex system in accordance with the present invention which provides for high and low levels of mobile transmitter power.

Detailed reference will now be made to the full duplex system shown schematically in Fig. 1 of the drawings, which includes a typical central station operating in conjunction with a typical one of a plurality of cooperating mobile stations.

The central station circuit comprises the transmitting antenna 101, energized by typical carrier wave transmitting circuit 102, which is connected for modulation by conventional audio signal transmitting circuit 103. For the purposes of the present illustrative embodiment, the system will be assumed to utilize frequency modulation for message signals although it is apparent that the teachings of the invention apply equally well to systems utilizing amplitude modulation, or in fact any carrier system of communication.

The central station receiving antenna 105 is connected to a conventional radio receiver which includes the carrier-wave receiving stages 106, comprising for example radio-frequency and intermediate-frequency amplifiers, a local oscillator, limiter stages, and such other components as are usually included prior to the signal detector stage 107. Output current from the signal detector 107 passes to the audio receiver 108, which includes the usual audio amplifier stages connected to drive an audio signal receiving device.

In order to derive an output current which varies as a function of the received carrier energy, connection is made to some point in radio carrier wave receiving circuit 106. For convenience, this connection is labeled as a separate element, amplitude detector 110, although in actual practice it may be found that the desired output current is produced by one of the elements included in the radio carrier-receiving circuit 106, for example, the grid of one of the limiter tubes. The direct current thus derived is utilized to energize the relay 111 against the opposing tension of a spring, the operating threshold being determined by biasing current from the source 112. Although in the present illustration the relay 111 is direct-current operated, it will be apparent that in an alternative embodiment alternating current proportional to the carrier-wave input might be derived at another point in the carrier-receiving circuit 106, and utilized to drive a different type of relay, for example, a thermal relay, to perform the functions of relay 111.

Interposed between the output terminals of the carrier-receiving circuit 106 and the input terminals of the amplitude-detector circuit 110 is an attenuation pad 113 which is indicated as a conventional resistance, but which may comprise any of the attenuator forms well known in the art, such as an H pad or a T pad, which is designed to produce an attenuation slightly in excess of the difference between the two possible levels of power transmitted by the mobile transmitter. In the present embodiment, this value of attenuation will be assumed to be 60 decibels. A short circuit is provided around the attenuation pad 113 which passes through the make-contact 111*a* of the relay 111. Alternatively, attenuation may be inserted by changing the bias on one of the tubes of the amplifier circuit 106, or by the excitation of thermistors placed in the transmission path. A circuit is also provided under control of relay 111 for connecting a conventional source of modulating tone 114 to the carrier-wave transmitting circuit 102 through the make contact 111*b*.

The mobile station comprises the receiving antenna 116 which is connected to a conventional radio receiving circuit including the carrier-wave receiving and detecting stages 117, which are connected to energize conventional audio receiving means 118. The mobile-transmitting antenna 120 is energized by a conventional radio transmitter which includes amplifier stages 121, which may be, for example, of the class C type, preceded by conventional carrier-wave transmitting stages 122, connected for modulation by a microphone or other audio signal transmitting means 123. A tone detecting circuit 125, which may comprise any well-known form of detector such as, for example, a tuned reed having a response period of the order of one-half second, is connected to respond to the tone-modulated output current from the carrier-wave receiver 117. The output terminals of tone detector 125 are connected in energizing relation to the relay 126, which actuates its armature to close the contact 126*a* when operated, and contact 126*b* when released Contact 126*b* connects the high voltage supply 128 through lead 129 to energize the plate and screen circuits of the amplifier 121; and in a similar manner, the contact 126*a* connects the low voltage source 127 to energize the plate and screen circuits of the amplifier 121. This expedient serves to shift the mobile transmitter between high and low levels of transmitted power.

The system described in the foregoing paragraphs operates in the following manner.

At the central station, the signals received by the receiving antenna 105 produce an output current in the amplitude-detector 110, which operates the relay 111 at a predetermined threshold of signal voltage supplied to it. The attenuator 113 is inserted ahead of the amplitude-detector 110 under control of the relay 111, so that when the relay 111 is operated, contacts 111*a* close, shorting out the attenuator 113. Relay 111, when operated, also connects the tone source 114 to the central station transmitter 102 for the purpose of signaling to the mobile station that the mobile power is too great and must be reduced.

At the mobile station, the pilot signal tone received through the receiving antenna 116 of the mobile receiver 117 is detected by the tone-detector circuit 125, output current from which energizes relay 126, causing it to open its contact 126*b* and close its contact 126*a*, thereby transferring the lead 129, which is connected to the plate and screen circuits of the vacuum tubes in the transmitter amplifier 121, from the high voltage supply 128 to the low voltage supply 127. For the purposes of the present illustration it will be assumed that this operation reduces output power transmitted from the mobile station to the central station by 50 decibels.

Accordingly when the mobile station is far away from any central station receiver, the signal received at the central station will be so low that the relay 111 does not operate, and hence no pilot signal is transmitted to the mobile station. Under this condition, mobile power will be at the "high" level. As the mobile station moves in closer to the central station, the amplitude-detector 110 in the central station receiver will receive enough signal power through the attenuator 113 to operate the relay 111. Closure of the relay contact 111a shorts out the attenuator 113. Simultaneously closure of the relay contact 111b connects the tone signal source 114 to the central station carrier-wave transmitter 102. Receipt of the transmitted tone from source 114 at the mobile station causes mobile transmitted power to be reduced from "high" to "low" level in the manner described. Inasmuch as the attenuator 113, as pointed out above, is preferably designed to have a decibel loss equal to or greater than the decibel change in the mobile power between the high and low levels, the signal at the central-station receiver, even though reduced, is still sufficient to hold the relay 111 operated. Thus, this difference in loss provided by attenuator 113 represents the difference in radio path loss between the just-operated and just-released thresholds of the relay 111 in the receiver circuit. It has been found that excessive switching is avoided in the central station receiver circuit by making this difference 10 to 15 decibels, as carried out in the present illustration.

If the mobile station moves farther away again, the signal received at the central station receiver will fall below the value necessary to maintain the relay 111 in operation, whereby, the contacts 111a are opened, reinserting the attenuator 113 in the circuit ahead of the amplitude-detector 110; and simultaneously removing the signal pilot tone from source 114 by releasing the contacts 111b. When the signal pilot tone ceases to be received at the mobile station, the tone detector relay 126 is deenergized, thereby opening the contact 126a, and closing the contact 126b, transferring the mobile transmitter back to the high power level. However, since the loss through the attenuator 113 is equal to or greater than the increase in power of the mobile transmitter, the receiver relay 111 will not reoperate until the radio path loss has decreased again.

In systems employing push-to-talk operation in the mobile unit, it is generally not possible for the car to receive while transmitting. In such cases the invention provides for the central station equipment to respond to conditions calling for reduced mobile power by storing information to this effect, and sending out a signal tone which immediately follows the next release of the push-to-talk button.

Figure 2:
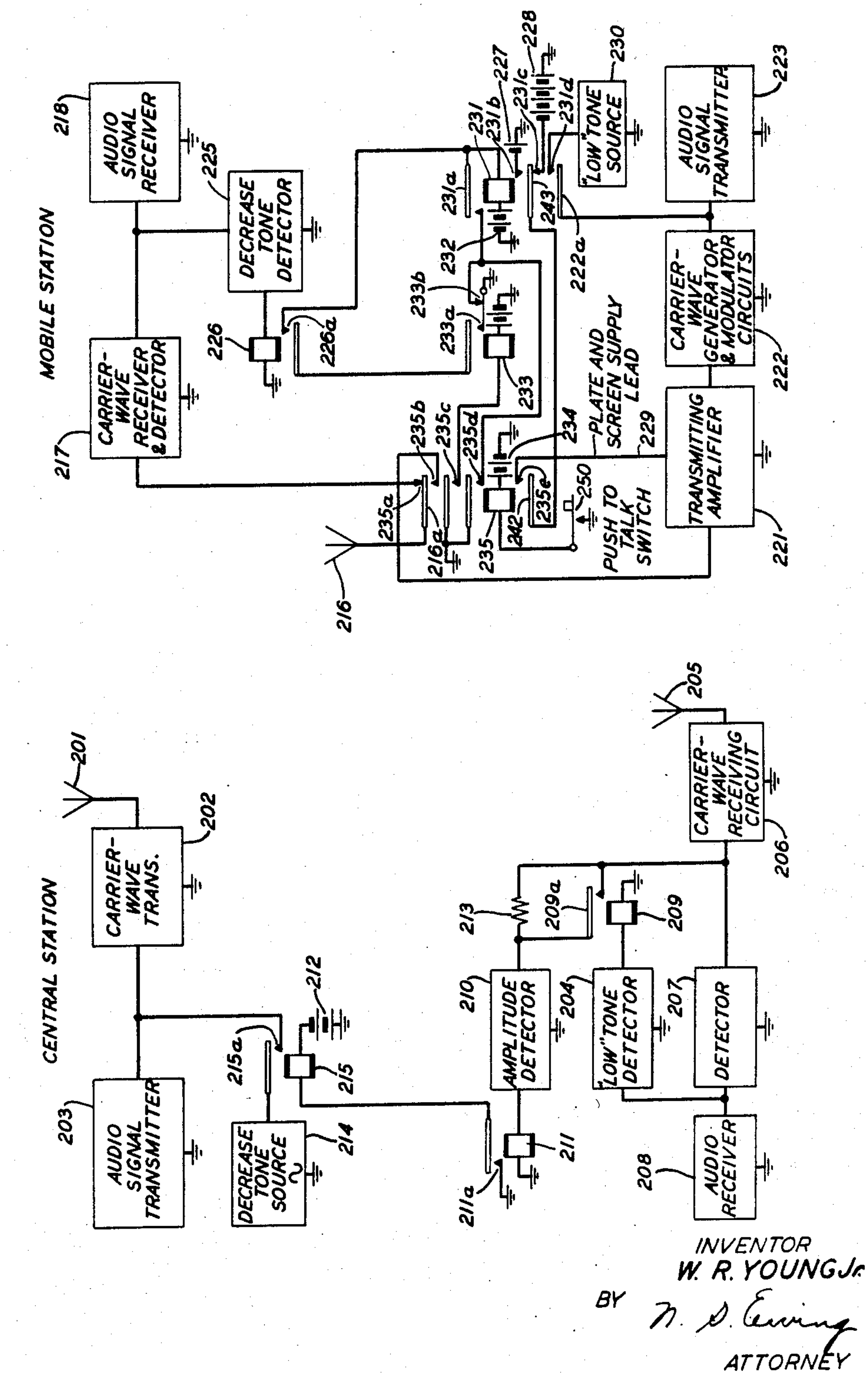
Fig. 2 shows a half duplex system, including a push-to-talk circuit at the mobile station, which provides for high and low levels of mobile transmitter power.

An arrangement to achieve such a two step control in push-to-talk systems is shown in Fig. 2 of the drawings.

The half duplex system shown in Fig. 2 includes a typical central station having separate transmitting and receiving equipments, and a typical one of a plurality of cooperating mobile stations, each of which has transmitting and receiving equipments which are alternatively operable under control of the push-to-talk switch. At the central station, the transmitting antenna 201 is connected to the output terminals of the conventional carrier-wave transmitter 202, in modulating relation to which is connected the signal transmitting circuit 203. As discussed with reference to the embodiment of Fig. 1, the present system will be assumed to utilize frequency modulation for message signals, although the novel features could equally well be applied to an amplitude modulation system.

The central station receiving antenna 205 is connected to a conventional radio receiver as described with reference to Fig. 1, which includes the carrier-wave receiving circuit 206, connected for signal demodulation by the detector circuit 207, whose output energizes the conventional audio receiving circuit 208 including audio amplifier and output stages. As described with reference to the embodiment of Fig. 1, the amplitude detecting circuit 210 is connected to some point in the carrier-wave receiving circuit 206, whereby output current related to the received carrier energy is derived to energize the relay 211. The energizing circuit of the slow-release relay 215, which includes the power source 212, is completed under control of the make-contact 211a of the relay 211. Interposed in series relation between the carrier-wave receiving circuit 206 and the amplitude detecting circuit 210 is an attenuation pad 213, which for the purposes of the present illustration will be assumed to give an attenuation of 60 decibels. Closure of a short circuit connected around the attenuation pad 213 is controlled by the make-contact 209a of relay 209, which is energized by the auxiliary "low tone" detecting circuit 204 connected in parallel energizing relation with the audio receiver 208 to the output of the detector 207. The auxiliary "low tone" detecting circuit 204 may, for example, comprise a tuned reed having a response characteristic which is tuned to the frequency of the "low" tone source 230 in the transmitting circuit of the corresponding mobile station, to be described hereinafter. A tone source 214 is connectable to the central station transmitting circuit 202 under control of the make-contact 215a of the slow-release relay 215.

The mobile station comprises a transmitting-receiving antenna 216, normally connected to a conventional radio receiving circuit, including carrier-wave receiving and detecting stages 217 connected in parallel to a pair of output branches, one of which includes the audio signal receiving means 218, and the other of which includes the decrease tone detector 225, which may comprise a tuned reed, connected to energize the relay 226. Alternatively, the antenna 216 is connectable through contact 235b upon operation of relay 235 to a conventional transmitting circuit, which includes the amplifier 221, preferably of the class C type, and conventional carrier-wave transmitting circuit 222, which is connected, for audio signal modulation, to a microphone or other suitable device 223.

Transfer of the mobile apparatus from a signal receiving to a signal transmitting condition is carried out by means of the relay 235 which is energized under control of the push-to-talk button 250, actuation of which completes its energizing circuit from ground through the energizing source 234. Thus, the armature 216a is connectable in the released condition of relay 235 to contact 235a, thereby connecting antenna 216 to the mobile receiver 217, and in the operated condition of relay 235, to connect the antenna 216 through contact 235b to the output terminals of amplifier 221.

The series of operations which accompany the transfer of the mobile system from a receiving to a transmitting condition, and which result in response at the mobile station to the information conveyed by pilot signals received from the central station, is carried out under control of a system of relays which include the relay 231 and the slow-release relay 233. These operations include the transfer of the connecting lead 229, identified with the plate and screen circuits of amplifier 221, from the high voltage source 228 to the low voltage source 227, and connection of the "low tone" source 239 for modulation of the output of the carrier-wave transmitter 222.

The aforesaid system of relays is connected as follows:

Upon operation of relay 235, the antenna 216 is disconnected through contact 235*a* from the mobile carrier-wave receiver 217, and antenna 216 is connected through make-contact 235*b* to transmitting amplifier 221. Contacts 235*c* and 235*d* are closed to ground, and contact 235*e* is closed to connect the plate and screen lead 229 of amplifier 221 either to the high voltage supply 228 through the break contact 231*c*, or to the low voltage supply 227 through the make-contact 231*b*, depending on whether relay 231 is operated or released. Operation of the relay 231 also connects the "low" tone source 230 through engagement of contact 231*d* to modulate the carrier-wave output of the transmitter 222.

Relay 231 is energized by the following steps: The make-contact 226*a* of relay 226 when closed functions to complete the energizing circuit of relay 231, including the potential source 232 to ground through the engaged make-before-break contact 233*a* of slow-release relay 233. Release of relay 233 under control of release of the push-to-talk button 250 applies ground to a self-locking circuit of relay 231 which passes through the make-contact 231*a*. An alternative locking path to ground for relay 231 extends through the make-contact 235*d* of relay 235 when energized.

The operating circuit for slow-release relay 233 passes to ground through the make-contact 235*c* of the relay 235.

A condition for optimum operation of the system is as follows:

The release time for slow-release relay 215 at the central station should exceed, by about 50 per cent, the release time for the slow-release relay 233 in the mobile station, which in turn should be sufficiently long to permit the decrease tone to register in the tuned reed detector circuit 225. The operating period for the tuned reed detector circuit 225 should preferably be of the order of one-half second.

The relationships of the operating times of the several relays and the purpose of the various parts described will be more apparent as they are called into use in the following description of the operation of the half duplex system.

It is assumed initially that the push-to-talk button 250 at the mobile station has been pressed, and that high level of power is being radiated. If the mobile station is sufficiently removed from the central station, the relay 211 in the central station receiver will not operate, and hence no steps will be initiated to reduce the mobile power. In terms of the received signal, relay 211 has two operate thresholds. One of these occurs when the attenuator 213 is by-passed. This operating threshold is preferably designed for a given level of performance which is somewhat better than just usable. The other operating threshold occurs when the attenuator 213 is inserted ahead of the amplitude detector 210 in the central-station receiver circuit. This threshold is higher by the amount of the loss through attenuator 213, which may be taken to be 60 decibels, for the purpose of illustration. For the condition related above, the relay 209 may be assumed to be released, whereby the pad 213 is in the circuit. Therefore, it is apparnt that the relay 211 will not operate unless the radio frequency signal received from the mobile station is 60 decibels or higher above the given level of performance.

However, if the signal is higher than the given level plus 60 decibels, the relay 211 operates, in turn operating relay 215 to engage its contact 215*a* applying "decrease" tone as modulation to the circuit of the central-station transmitter 202.

When the push-to-talk button 250 is released, mobile carrier ceases to be transmitted, the relay 211 releases, and after a short delay, the slow-release relay 215 also releases. Meanwhile, the receiver 217 at the mobile station has been restored to its connection with the receiving antenna 216 by release of the relay 235, whereby the contactor 235*a* is reconnected; hence the "decrease" tone is received for a short interval by the mobile receiver 217. The signal detected by the "decreased" tone detector circuit 225 operates the relay 226, which in turn operates relay 231 through a circuit including the closed contact 226*a* of relay 226, and contact 233*a* of relay 233. Relay 233 is still operated at this moment because of its slow-release characteristic, although its operating winding path was broken by release of the push-to-talk switch. Release of relay 233 now follows, which establishes a locking path for relay 231 through closed contact 231*a* and closure of contact 233*b*, which for successful operation must occur before release of relay 226 opens contact 226*a*.

Upon the next operation of the push-to-talk button 250, the relay 235 operates, closing another locking path for the relay 231 through the contact 235*d*. Operation of relay 235 also energizes the relay 233 by connection to ground through the closed contact 235*c*. Inasmuch as relay 231 has remained operated, the plate and screen supply lead 229 of the transmitting amplifier 221 is furnished with low voltage from the source 227 through the relay contact 231*b*. This reduces the radiated power from the mobile transmitter by an appropriate fixed amount, which, for the purposes of the present illustration, has been assumed to be 50 decibels. Operation of the relay 231 also applies "low" tone as modulation on the signal transmitted by the mobile transmitter, by connecting the "low" tone source 230 to the mobile carrier-wave transmitting circuit 222 through the contact 231*d*. The "low" tone is preferably made inaudible in the central station receiver 208, either by choosing a subaudible or a superaudible frequency, or by filtering out this tone in the circuits connec[illegible] to the central-station receiver.

The "low" tone signal detector 204 at the central station operates the relay 209, thereby removing attenuator 213, which, for the purpose of the present illustration, has been assumed to have a value of 60 decibels. As a result, the relay 211 will again operate even though the transmitted mobile power has been reduced by 50 decibels. Relay 215 thus operates and applies "decrease" tone to the transmitter. Upon release of the push-to-talk button 250 at the mobile station, the relay 235 releases opening the locking path of the relay 231 through the contact 235*d*. The relay 231 then releases. After a short delay, the relay 233 releases and opens the operating path of relay 231 through the contact 233*a*. If a "decrease" tone were not received at the mobile station, the relay 231 would remain released until the end of the next push-to-talk interval. Under the present set of conditions, however, operation of the relay 226 again provdies operating path for relay 231 during this interval. As pointed out hereinbefore, for optimum operation, it is preferred that the slow-release interval of the relay 215 in the central station be longer than that of the relay 233 in the mobile station and that the interval of operation of the "decrease" tone detector 225 be shorter than either of the aforesaid.

As long as the relay 231 is operated, the mobile signal will continue to be modulated with the "low" tone, whereby the relay 209 at the central station remains operated. The attenuation pad 213 is thus shorted out, causing the threshold of operation of the relay 211 to correspond to the given standard level. If, because of increased path loss between the mobile station and the central station, the received signal decreases below the given standard level, the relay 211 will fail to operate during the push-to-talk interval, whereupon the "decrease" tone is not sent, and the relay 226 in the mobile station fails to operate. Thus, when the locking path is opened during the interval between the release of the relays 235 and 233, the relay 231 will release, breaking contact 231b, and connecting contact 231c, which operation maintains the mobile transmitter on high power during the next mobile talking period.

Thus, mobile-transmitted power is again 50 decibels higher, and at the same time, the signal required to operate the relay 211 has been increased by 60 decibels. Accordingly, the relay 211 will not operate until the path loss between the mobile and central stations has been reduced by 10 decibels. As pointed out previously, this is a desirable feature in that it obviates changing transmitter power too frequently.

The primary purpose in passing the energizing circuit of the relay 231 through the make contacts 233a and 233b on the relay 233 is to permit the "decrease" tone to effect operation only during the short interval directly following the push-to-talk period for the mobile transmitter. Thus, in case of a call from one mobile unit to another through the central station, each of the mobile units will be controlled individually inasmuch as they are operated alternately.

With two values of radiated power, the range of signal power in decibels which arrives at the central station can be halved. It is apparent that where three values of power are available, this range could be reduced to one third.

Figure 3:
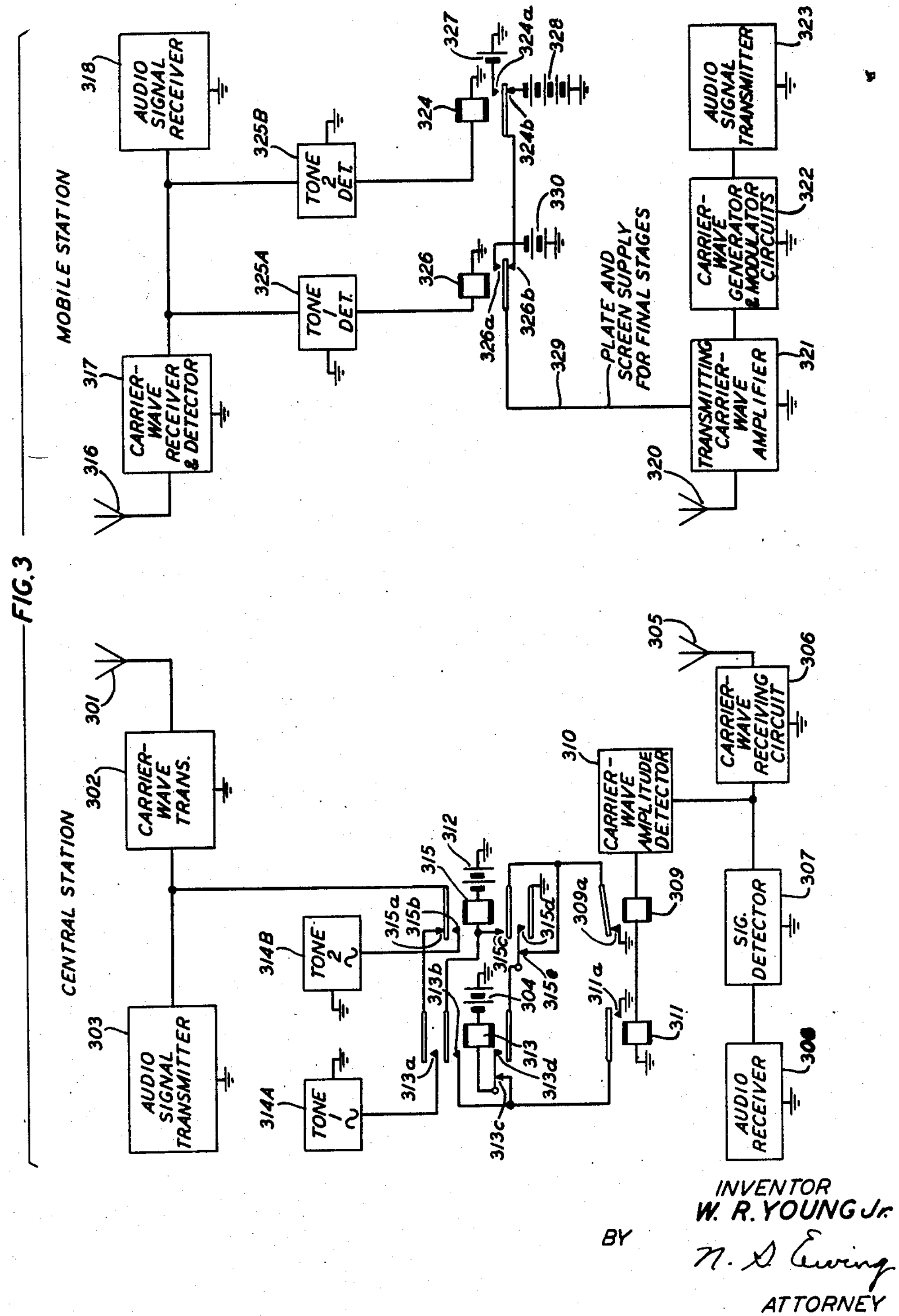
Fig. 3 shows a full duplex system in accordance with the present invention which provides also for levels of transmitter power between high and low.

A full duplex system in accordance with the present invention which provides for three different ranges of transmitted power is indicated in Fig. 3 of the drawing.

Referring in detail to Fig. 3, the central station of the mobile system comprises a transmitting antenna 301 which is energized by a conventional carrier-wave transmitter 302, in modulating relation to which is connected a conventional audio signal transmitting circuit 303. As in the case of the previous embodiments, the present circuit will be assumed to be operated as a frequency modulation system, although it is equally adaptable with slight change for application to amplitude modulated systems.

The central station receiving antenna 305 is connected to a conventional radio receiver, such as previously described, which includes the carrier-wave receiving circuit 306 connected to the signal detecting circuit 307 which energizes the conventional audio signal receiving circuit 308. As previously pointed out, output current related to the received carrier energy may be tapped off at some point in the carrier-wave receiving circuit 306. This source of derived current is represented by the box designated carrier-amplitude detector 310, connected in energizing relation to the relays 309 and 311 in series relation. The relay 309, which is preferably designed to have an operating threshold of the order of 10 decibels above the minimum threshold for received signal transmission, in operated condition engages its contact 309a to make ground connection. The relay 311, which preferably has an operating threshold which is some selected value, say, X plus 10 decibels, above the operating threshold of the relay 309, operates to close its contact 311a to ground. Ground is supplied through contact 311a and make-before-break contact 313d to the energizing circuit of a slow-operate slow-release relay 313. The relay 313, upon being energized through a circuit which includes the source 304, performs the following operations: it causes contact 313a to be engaged, connecting the source 314A of modulating tone No. 1; it causes engagement of make-before-break contact 313d, after which the contact 313c is opened; further, it causes engagement of contact 313b. The engaged contact 313b connects circuit from the ground through contact 313a of the relay 311 to the slow-operating slow-release relay 315. Thus, the locking pair 313c, 313d of the relay 313 is preferably designed so that 313d is engaged before the operating circuit of the relay 315 is broken. The engaged contact 313d connects a self-locking circuit from the relay 313 through either of two alternative paths, one of which passes through the contact 315d to ground under control of the relay 315; and the other of which passes to ground under control of contact 309a of the relay 309.

The slow-operate slow-release relay 315 is energized by potential source 312 upon the operation of relay 311 completing a path to ground which includes the contact 311a and the operated contact 313b. Energization of the slow-operate slow-release relay 315 causes disengagement of its contact 315a, thereby disconnecting the source 314A of tone No. 1 from the carrier-wave transmitter 302; and further, causes engagement of the contact 315b connecting the tone source 314B of tone No. 2 in modulating relation to the transmitter 302. Simultaneously, contacts 315c and 315d are engaged, and contact 315e is broken, whereby connection is made from ground through the contact 309a to lock up the energizing circuit of the relay 315. Contacts 315d and 315e are so related that the former contact is engaged before the latter is broken, thus providing ground connection for locking the energizing circuit of relay 313 before breaking the ground connection obtained for this circuit through contact 309a.

The mobile station includes conventional receiving antenna 316 connected to a conventional radio receiver which includes the carrier-wave receiver and detector stages 317 connected to energize the conventional audio receiver 318. The transmitting circuit is also conventional and includes audio transmitting means, such as microphone 323, connected in modulating relation to the carrier-wave transmiting stages 322, which drive the power amplifier 321 connected in energizing relation to the transmitting antenna 320.

A pair of tone detecting circuits 325A and 325B, which comprise, for example, tuned reeds respectively responsive to tones No. 1 and No. 2 from the sources 314A and 314B at the central station, are connected in parallel with each other and the audio receiving means 318 to the output of the mobile carrier-wave receiver and detector circuit 317. The tone detectors 325A and 325B are respectively connected to energize the relays 326 and 324. The relay 326, when energized, engages its contact 326a, connecting the medium potential source 330 through the connecting lead 329 to the plate and screen circuits of the final stages of the transmitting amplifier 321. When the relay 326 is released, the contact 326b is engaged connecting the plate and screen lead 329 of the amplifier 321 to the high potential source 328 through the contact 324b, assuming that the relay 324 is also deenergized. When the relay 324 is energized, the contact 324b is broken, and contact 324a is engaged connecting the low potential source 327 to the lead 329 through operated contact 326b of relay 326 assuming the latter relay to be deenergized. The medium potential source 330 is given such a value that it produces a transmitter output power at the mobile station which is some selected value, say X decibels, below the output power produced when the circuit 329 is connected to the high potential source 328. Moreover, the low potential source 327 is of such a value that the output power which it produces in the mobile transmitter is preferably 2X decibels below the high level of transmitter power, and X decibels below the medium level of transmitter power.

The slow-operate slow-release relay 315 in the central station is preferably designed to have a slow enough period of operation so that it remains unoperated during the period in which tone signal received in the mobile station operates to change the power level of the mobile transmitter.

Operation of the system described in the foregoing paragraphs will proceed as follows:

Assume that the mobile station is at first beyond a given range of the central station and that the mobile transmitter is accordingly operating at its high level of transmission. As it approaches the central station, the intensity of the signal there received graudally increases until it exceeds the operating threshold of the relay 309, which is preferably designed to operate at, say 10 decibels, above the minimum threshold for signal transmision. Upon operation, relay 309 closes contact 309a to ground, conditioning the locking circuits for the slow-operate slow-release relays 313 and 315 but performing no other function. The mobile station continues to move in the direction of the central station until the energy level of the power received at the central station has exceded an amout X plus 10 decibels above the operating threshold of the relay 309. At this point, the relay 311 reaches its operating threshold, closing its contact 311a and thereby connecting ground to the energizing circuit of the relay 313 through a circuit which includes the break-after-make contact 313c. Upon being energized, the slow-operate slow-release relay 313 performs the following operations: it causes engagement of contact 313a, connecting tone source 314A to the transmitter 302 for transmission of tone No. 1; it causes engagement of contact 313b; and it causes engagement of contact 313d, before contact 313c is opened, thereby locking itself energized through a circuit which includes the break-after-make contact 315e of the relay 315 and the ground contact 309a of the relay 309.

At the mobile receiver, tone No. 1 received from the central-station transmitter, through the mobile receiving antenna 316 and mobile carrier receiver 317, is detected in the tone No. 1 detecting circuit 325A, the output current from which energizes the relay 326. This operates to cause its contact 326b to break connection to the high potential source 328 through closed contact 324b of the unenergized relay 324 and to cause its contact 326a to connect the medium source of potential 330, thereby changing the potential through the lead 329 to the plate and screen circuits of amplifier 321. This operation reduces the output of the mobile transmitter by an amount X decibels.

It is assumed that the relay 315 in the central station is too sluggish to operate during the interval required for this change in mobile power from high to medium. Hence, although the energizing circuit for the relay 315 is completed through a path which includes the contact 311a of relay 311 and contact 313b of the relay 313, this relay does not operate unless, even after reduction in power by the mobile transmitter, the power received at the central station still exceeds the operating threshold of the relay 311, holding it operated. Assuming that such is the case and that the mobile station has meanwhile moved closer to the central station, the relay 315 becomes energized, causing its contact 315a to break connection to source 314A of tone No. 1 and causing its contact 315b to engage connecting tone source 314B to the transmitter 302, whereby the transmitted carrier wave is modulated with tone No. 2.

When tone No. 1 ceases to be received by the mobile transmitter, the relay 326 deenergizes, breaking its contact 326a and engaging its contact 326b. Reception of tone No. 2 by the mobile receiver 317 and the tone No. 2 detecting circuit 325B causes relay 324 to operate, causing its contact 324b to break connection to the high voltage source 328 and causing the contact 324a to engage connecting the low voltage source 327, thereby transferring the mobile-transmitter power from medium to low, which, as pointed out before, is preferably X decibels below the medium power level, and 2X decibels below the high power level.

Simultaneously, at the central station, operation of the relay 315 also closes its self-locking circuit through contact 315c under control relay 309 and closes another locking circuit to relay 313 through contact 315d, whereby, if the signal received by the central station from the mobile transmitter becomes too weak to operate either of the relays 309 or 311, the slow-operate relay 313 remains operated during the period of release of the slow-operate relay 315. Thus, tone No. 1 from the tone source 314A is transmitted after tone No. 2 is discontinued through the disconnection of tone source 314B, whereby relay 326 at the mobile transmitter remains operated after relay 324 has been deenergized, and hence, operation of the mobile transmitter reverts from low power to medium power. If now or subsequently the radiation of medium power from the mobile station does not cause relay 309 to remain operated, the opening of contact 309a removes the locking path for relay 313. Release of relay 313 causes removal of tone 1 from the transmitter 302. Relay 326 releases, and high voltage source 328 is connected to lead 329 through contacts 326b and 324b, thus causing the mobile station to radiate high power.

Any one of the suggested embodiments may be used in a system which employs more than one central-station receiver to give area coverage, provided that some type of receiver selection is used to contact the receiver which has the most acceptable signal. Under such an arrangement, only one receiver at a time is associated with the relay at the central station.

It will be apparent, to those skilled in the art, that practice of the invention is not limited to the particular embodiments shown by way of illustration.

What is claimed is:

1. A mobile radio system comprising a relatively fixed central station and a relatively mobile subscriber's station, wherein said central station includes signal transmitting means and signal receiving means in simultaneous operation, and wherein said mobile station comprises signal transmitting means and signal receiving means in alternative operation, a mobile pilot signal source connectable to said mobile transmitting means, a pilot signal detecting means for detecting the central station pilot signal connected to said mobile signal receiving means, said signal receiving means at said central station including a pair of detecting circuits connected in parallel, one said detecting circuit tuned to the carrier frequency of said mobile station, the second said detecting circuit tuned to said pilot signal from said mobile station, an attenuator connected in series with said first detecting circuit, a source of central station pilot signal, means responsive to a preselected level of power in said first detecting circuit for connecting said source of central station pilot signal to said central station signal transmitting means, means responsive to the receipt of mobile pilot signal in said second detecting circuit for shunting said attenuator out of said first detecting circuit, a push-to-talk control at said mobile station for controlling the alternative operation of said mobile transmitting means and said mobile receiving means, and means at said mobile station under control of said central station pilot signal detecting circuit and said push-to-talk control, for reducing the output signal power of said mobile transmitting means from a reference power level to a reduced power level and connecting said mobile pilot signal source to said mobile transmitting means.

2. A mobile radio system in accordance with claim 1 wherein said means responsive to a preselected level of power in said first detecting circuit for connecting said source of central station pilot signal to said central station signal transmitting means includes a first slow-release relay operative for a given interval following the termination of transmission by said mobile station.

3. A mobile radio system in accordance with claim 2 wherein said means under control of said central station pilot detecting circuit and said push-to-talk control for connecting said means for reducing the output signal power of said mobile transmitting means and for connecting said mobile pilot signal source to said mobile transmitting means, comprises a second slow-release relay operative for a given interval following the termination of transmission by said mobile station.

4. A mobile radio system in accordance with claim 3 wherein the interval of operation of said first slow-release relay exceeds the interval of operation of said second slow-release relay.

5. A mobile radio system in accordance with claim 1 in which the power loss through said attenuator slightly exceeds the difference between said selected reference power level and said reduced power level of said mobile transmitting means.

6. In a radio system comprising a central station and a mobile station, including signal transmitting means and signal receiving means at each of said stations, at least one source of pilot signal at said central station, means under control of the signal receiving means at said central station for connecting said source to said central station transmitting means, a pilot signal receiver connected to said signal receiving means at said mobile station for receiving the pilot signal from said central station, a circuit under control of said pilot signal receiver at said mobile station for reducing the signal power output of said mobile transmitting means by a fixed amount, and a circuit connected to said receiving means at said central station having at least two different levels of response to received signals from said mobile station, the difference between which levels slightly exceeds the amount of signal power reduction of said mobile transmitting means, and means under control of said last-named circuit, said means connected to said source at said central station and operative at one said level and not the other said level for actuating said pilot signal connecting means.

7. In a radio system comprising a central station and a mobile station, including signal transmitting means and signal receiving means at each of said stations, a plurality of sources of pilot signal of respectively different frequency tones at said central station, switching means under control of the signal receiving means at said central station respectively responsive to different thresholds of signal power received from said mobile station for connecting different ones of said sources to said central station transmitting means, a plurality of pilot signal receivers connected to said signal receiving means at said mobile station, each of said pilot signal receivers having a response characteristic which corresponds to a tone from a respective one of said sources of pilot signal at said central station, a plurality of circuits each one of which is under control of a respective one of said pilot signal receivers at said mobile station for establishing the signal power transmitted by the transmitter at said mobile station at a respective one of a plurality of preselected fixed transmission levels wherein the difference between successive operating thresholds for said switching means slightly exceeds the difference between successive levels of transmission by the transmitter at said mobile station.

References Cited in the file of this patent

UNITED STATES PATENTS

| Number | Name | Date |
|---|---|---|
| 1,743,132 | Green | Jan. 14, 1930 |
| 1,777,355 | Fetter | Oct. 7, 1930 |
| 2,326,290 | Dickieson | Aug. 10, 1943 |
| 2,392,672 | Koch | Jan. 8, 1946 |
| 2,425,614 | Goddard | Aug. 12, 1947 |
| 2,521,696 | Armond | Sept. 12, 1950 |
| 2,530,418 | Alvarez | Nov. 21, 1950 |